Dec. 24, 1935.   C. JACKSON   2,025,287
VIBRATING MOTOR
Filed Sept. 26, 1934   2 Sheets-Sheet 1

INVENTOR.
Corwill Jackson
BY
Chappell Earl
ATTORNEYS

Dec. 24, 1935.   C. JACKSON   2,025,287
VIBRATING MOTOR
Filed Sept. 26, 1934    2 Sheets-Sheet 2
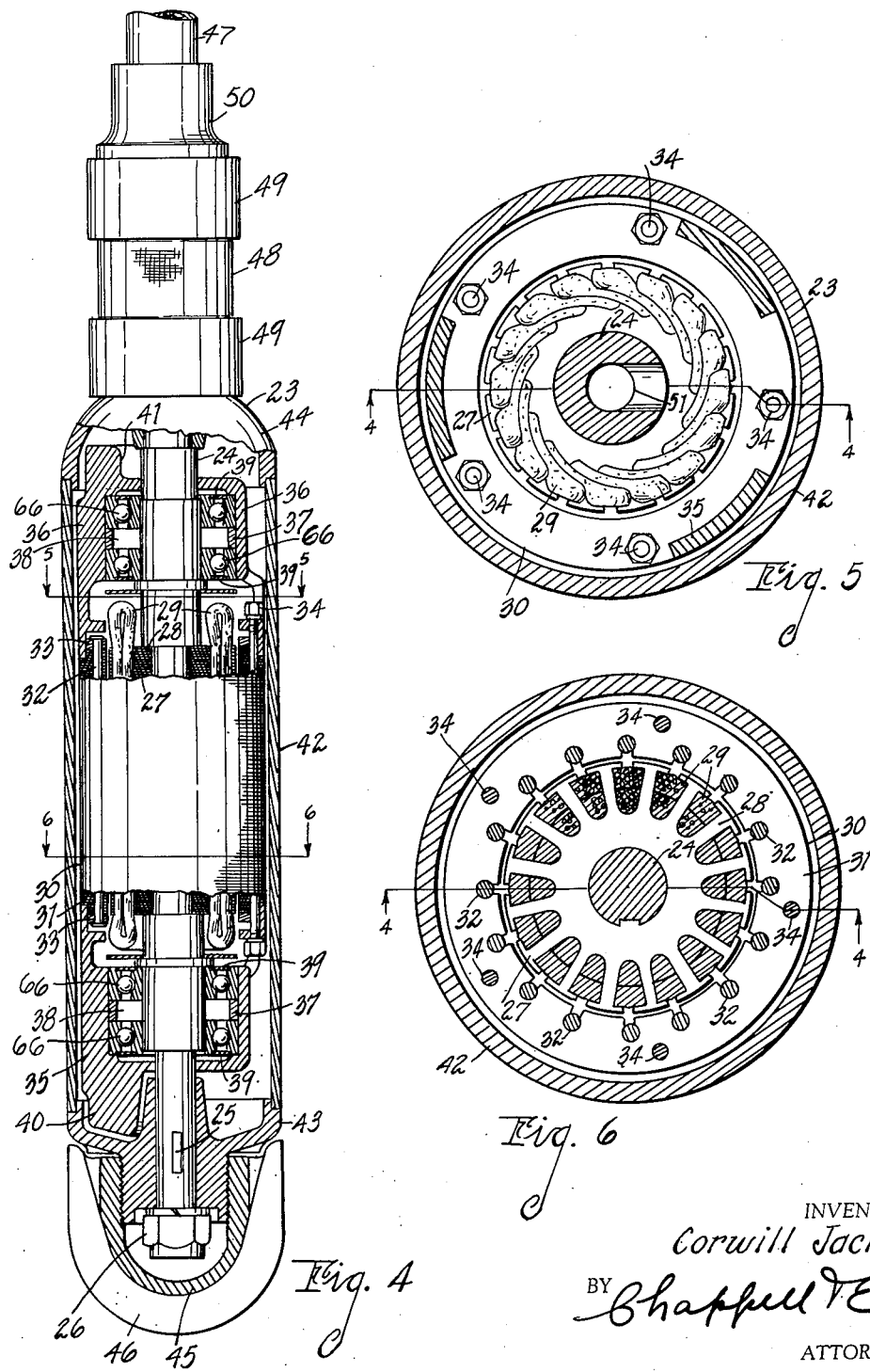
INVENTOR.
Corwill Jackson
BY Chappell V Earl
ATTORNEYS Patented Dec. 24, 1935

2,025,287

UNITED STATES PATENT OFFICE 2,025,287

VIBRATING MOTOR

Corwill Jackson, Ludington, Mich.

Application September 26, 1934, Serial No. 745,563

9 Claims. (Cl. 259—72)

The main objects of this invention are:

First, to provide an improved electric motor which is especially well adapted for operating vibration apparatus such as tampers and devices for vibrating newly poured concrete internally.

Second, to provide a motor of the foregoing character, which is characterized by a high flywheel effect in proportion to its weight.

Third, to provide a squirrel cage induction motor of small diameter.

Objects relating to details and economies of my invention will appear from the description to follow. The invention is defined and pointed out in the claims.

Structures which are preferred embodiments of my invention are illustrated in the accompanying drawings, in which:

Fig. 4 is a fragmentary view in side elevation of a concrete vibrating device embodying the features of my invention, portions of the device being broken away and shown in longitudinal section on a line corresponding to line 4—4 of Figs. 5 and 6.

Fig. 5 is an enlarged transverse section taken on a line corresponding to line 5—5 of Fig. 4.

Fig. 6 is an enlarged transverse section taken on a line corresponding to line 6—6 of Fig. 4.

In squirrel cage induction motors of conventional design, it is customary to wind the field coils on forms, after which the coils are inserted in slots of the laminated stator and secured by strips of hardwood or fiber acting as supporting wedges. The rotor of the conventional squirrel cage type motor is arranged within the stator and consists of a laminated core having spaced holes around its periphery into which are driven copper conductor bars, the ends of which are usually welded to short-circuiting rings, thus forming a so-called squirrel cage rotor. My motor departs from such conventional design inasmuch as the windings are placed in suitable slots on a non-revolving inner core or stator while the rotor or squirrel cage revolves around the fixed stator.

To the ends of the revolving squirrel cage are secured end caps which serve as brackets for the ball bearings which are in turn supported at the ends of the stator upon a non-revolving shaft. An outer casing consisting of sections is secured to the ends of the shaft. With this arrangement, I obtain a maximum flywheel effect and thus reduce the dimensions and weight of the motor materially over that possible in the conventional design. Further, the bearings are arranged in their most effective position to transmit forces acting between the shaft and the operating mechanism of the device.

These advantages are particularly important in tools of the manually operated or portable type such as tie tampers or other impact tools in which class of tools it is essential that a motor with maximum flywheel effect be used so as to provide sufficient momentum to actuate the striking cam or roller. In the past, in order to obtain this maximum flywheel effect, it was necessary in the conventional design to either install a flywheel member on the armature shaft or increase the armature to abnormal dimensions, each of which tends to so increase the weight of the machine that it is difficult for the operator to manually manipulate it. My improved motor solves this problem in providing a high flywheel effect in proportion to weight.

Figure 1:
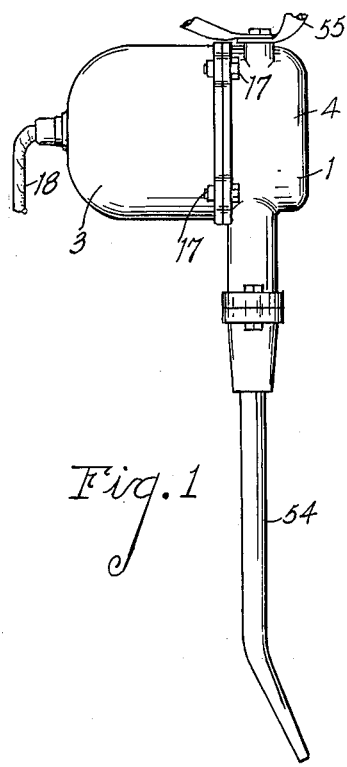
Fig. 1 is a view in side elevation of an electric tamper embodying the features of my invention.
Figure 3:
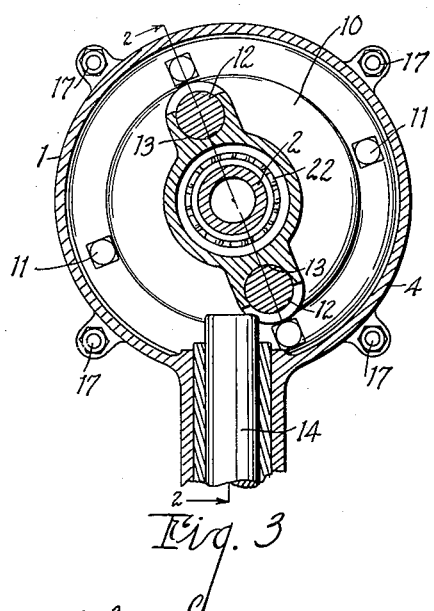
Fig. 3 is a transverse vertical section taken on a line corresponding to line 3—3 of Fig. 2.
Figure 2:
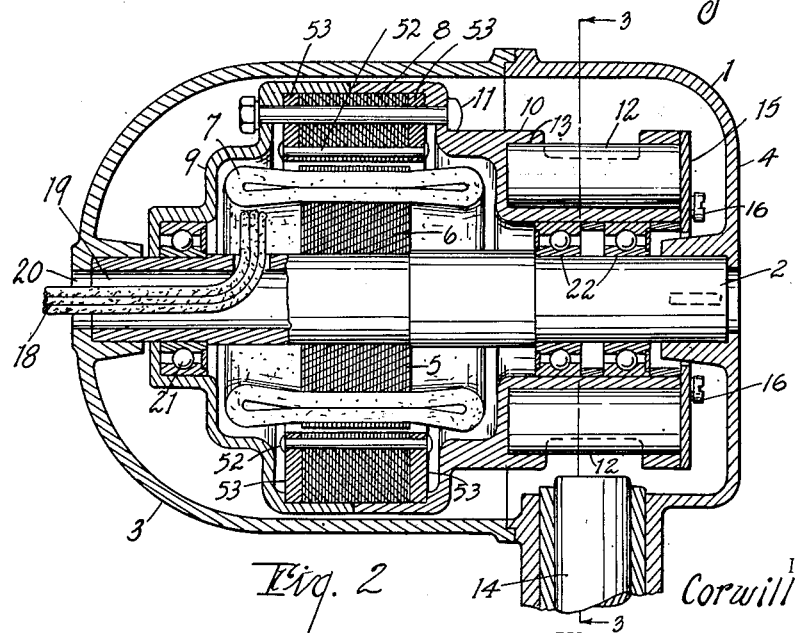
Fig. 2 is an enlarged fragmentary longitudinal section taken on a line corresponding to line 2—2 of Fig. 3.

Referring to Figs. 1 to 3, inclusive, of the drawings, I in general is a tie tamper embodying the features of my invention. This tamper is provided with a stationary or non-rotating shaft 2 supported at its ends by the outer casing sections 3 and 4. On the stationary shaft is mounted a stator 5 consisting of the laminations 6 and windings 7. The squirrel cage revolving element or rotor 8 is provided with end caps or members 9 and 10 which are securely clamped thereto by means of through bolts 11. Impact rollers 12 are carried in recesses 13 formed in the end member 10 as shown.

The tappet 14 is arranged to be interposed in the path of the impact rollers 12, the latter being held in position by the retaining plate 15 secured to the assembly by screws 16. The casing sections 3 and 4 enclose the assembly and are clamped together by means of the bolts 17. The windings 7 are connected to a 60-cycle 3-phase alternating current power source (not shown) by the conductors 18 which extend through the axial bore 19 and opening 20 in the stationary shaft 2 and casing 3 respectively.

The rotor is rotatably mounted on the stationary shaft by means of the bearings 21 and 22, the latter being arranged in the spaces between the ends of the stator and the ends of the casing sections 3 and 4. The spaced bearings 22 are disposed in a transverse plane between the impact rollers 12 and the shaft 2 in such manner that the forces transmitted are balanced. Further, the arrangement of the rotor in my construction is such that I obtain the ultimate in flywheel effect and am thereby enabled to reduce the dimensions and weight of the motor materially over that possible where the conventional design is employed.

The conductor bars 52 are arranged through suitable openings in the laminations of the rotor and are connected at their ends to the end rings 53 disposed between the laminations and the end caps 9 and 10, as shown, the end rings being of the same shape but thicker than the stator laminations. A very compact external rotor is thus provided having a maximum flywheel effect considering the small size of the motor and its low rating and light weight.

The tamper tool 54 is operatively associated with the tappet 14 so that the machine causes the tool to deliver a rapid series of hammer-like blows in operation, the machine being moved from place to place by means of the handle 55. A very powerful, light and efficient hammer blow tie tamper is the result.

Another feature of my improved vibration motor is that its organization permits the making of a vibration implement of very small diameter. This is highly desirable in that type of implement adapted to be submerged in newly poured concrete to vibrate the same in the form. The size of such implements in the past has been limited to the size of the motor. My motor, however, can be made of such small diameter that implements powered thereby can be reduced greatly in size for any given rating, as set forth below.

Referring to Figs. 4 to 6 inclusive of the drawings, 23 is in general a device or implement for vibrating newly poured concrete internally and within the form. In this modification, the stationary or non-revolving shaft 24 is prevented from rotating by the Woodruff key 25 and clamping nut 26. The stator 27 is fixed to the stationary shaft and comprises the laminations 28 and windings 29. The rotor 30 revolves around the stator and comprises laminations 31, conductor bars 32 and short-circuiting rings 33 for the conductor bars.

I secure to the rotor assembly by means of through bolts 34 the end caps or members 35 and 36 which are recessed to carry the pairs of ball bearings 66, the latter being separated in each case by a spacer washer 37 and thus forming a compartment 38 into which is packed a lubricant for the bearings. The lubricant is sealed within the bearing by steel washers 39 and the bearings are thereby substantially permanently lubricated.

I conform the end caps 35 and 36 to provide the unbalancing sectors or weights 40 and 41. On the rotation of the rotor, the unbalancing weights act directly through the bearings to vibrate the stationary shaft 24 transversely of its length, these vibrations being transmitted to the outer casing 42 consisting of a length of steel tubing and end members or caps 43 and 44 which are securely clamped thereto through the stationary shaft 24. The lower cap 43 is provided with an outer protecting cap 45 having fins 46 acting to resist the tendency of the implement to rotate in operation. The upper cap 44 is held in position by a clamping nut like 26.

A handle 47 is flexibly connected to the cap 44 through a heavy section 48 of hose, the ends of which are secured by clamps 49 to the upper cap 44 and adapter 50. The conductors (not shown) leading to the stationary field coils 29 pass through a hollow portion 51 in the shaft and upwardly through the handle to a suitable connector plug or switch (not shown).

By constructing an implement in the foregoing manner, I have obtained one having a diameter as low as four inches, the entire device being sealed for submersion in concrete or other plastic material. With this small diameter, the implement is very effective and more adaptable than those having a relatively large diameter. The vibrating motor has a normal rating of .75 power and an efficiency of approximately 80% which is indeed high for a machine of such small diameter. This, coupled with the high flywheel effect, results in a very desirable light yet powerful vibrating unit.

I have illustrated and described my improvements in embodiments which I have found very practical. I have not attempted to illustrate or describe other embodiments or adaptations, as it is believed this disclosure will enable those skilled in the art to embody or adapt my improvements as may be desired.

Although I have shown and described certain specific embodiments of my invention, I am fully aware that many modifications thereof are possible. My invention, therefore, is not to be restricted except insofar as is necessitated by the prior art and by the spirit of the appended claims.

Having thus described my invention, what I claim as new and desire to secure by Letters Patent, is:

1. In an induction motor of the character set forth, the combination with a casing having a central shaft non-rotatably mounted therein, of a tubular rotor rotatably carried by said shaft, bearings arranged between said shaft and the ends of said rotor, and a stator fixed to said shaft within said tubular rotor, said stator comprising laminations having longitudinal openings, and windings disposed in said openings, and said rotor comprising annular laminations having longitudinal slots, conductor bars disposed through said slots, end rings connected to said conductor bars, and end members on said rotor constituting housings for said bearings, the end members being conformed to provide eccentric weights.

2. In an induction motor of the character set forth, the combination with a tubular casing, end caps on said casing, a central shaft extending at its ends through said end caps, and means threaded to the ends of said shaft and securing the parts together, of a laminated stator keyed to said shaft medially of its ends and having winding coils, a laminated rotor adapted to rotate between said casing and stator and having end conductor rings and longitudinal conductor bars, end members on said rotor conformed to provide unbalancing weights and having internal bearing recesses surrounding said shaft, and bearings disposed on the shaft within said recesses, the operation of the rotor producing a rapid vibration of the casing and parts associated therewith.

3. In an induction motor of the character set forth, the combination with a casing, a central shaft, and means securing the parts together, of a laminated stator keyed to said shaft medially of its ends and having winding coils, a laminated rotor adapted to rotate between said casing and stator and having end conductor rings and longitudinal conductor bars, end members on said rotor conformed to provide unbalancing weights and having internal bearing recesses surrounding said shaft, and bearings disposed on the shaft within said recesses.

4. In an induction motor of the character set forth, the combination with a casing, a central shaft, and means securing the parts together, of a stator fixed to said shaft medially of its ends and having winding coils, said shaft being hollow in part to receive conductors, a rotor adapted to rotate between said casing and stator and having end conductor rings and longitudinal conductor bars connected to said rings, end members on said rotor having internal bearing recesses surrounding said shaft, and bearings disposed on the shaft within said recesses.

5. A vibrating induction motor comprising a stationary shaft hollow in part to receive conductors, a stator fixed to said shaft, a rotor rotatable on said shaft and housing said stator, and unbalancing weights integral with the ends of said rotor and acting to vibrate said shaft transversely of its length.

6. A vibrating motor comprising a casing having opposed end walls, a central shaft keyed to the end walls of said casing, a stator fixed to said shaft between its ends, a rotor rotatable on said shaft and housing said stator, bearings for said rotor on said shaft, and vibrating means operatively associated with said rotor, said means being integral with said rotor and adjacent said bearings.

7. A vibrating induction motor comprising an elongated tubular casing, a central shaft fixedly mounted at its ends to the ends of said casing, said shaft being hollow in part to receive conductors, a stator fixed to said shaft between its ends, a rotor embracing said stator, bearings for the rotor arranged on said shaft between the ends of the stator and the ends of the casing, and unbalancing weights at the ends of said rotor.

8. A vibrating induction motor comprising an elongated tubular casing, a central shaft fixedly mounted at its ends to the ends of said casing, a stator fixed to said shaft between its ends, a rotor rotatable on said shaft at the ends of and embracing said stator, and an unbalancing weight formed interiorly on said rotor.

9. A vibrating motor comprising a central stationary shaft, a stator fixed to said shaft, an elongated tubular rotor housing said stator and projecting beyond the ends thereof, and bearings arranged between the ends of said rotor and shaft, said rotor ends being conformed to provide unbalancing weights for vibrating said shaft transversely of its length through said bearings.

CORWILL JACKSON.